(No Model.)

E. E. GOLD.
STEAM RADIATOR.

No. 496,117. Patented Apr. 25, 1893.

WITNESSES:
John Becker
Fred White

INVENTOR:
Edward E. Gold,
By his Attorneys,
Arthur E. Fraser & Co.

UNITED STATES PATENT OFFICE.

EDWARD E. GOLD, OF NEW YORK, N. Y.

STEAM-RADIATOR.

SPECIFICATION forming part of Letters Patent No. 496,117, dated April 25, 1893.

Application filed July 27, 1892. Serial No. 441,352. (No model.)

*To all whom it may concern:*

Be it known that I, EDWARD E. GOLD, a citizen of the United States, residing in the city, county, and State of New York, have invented certain new and useful Improvements in Steam-Radiators, of which the following is a specification.

This invention relates to heat storage radiators adapted to be heated by admitting steam, and to become charged with heat which is gradually radiated after the supply of steam is cut off. Such heaters are generally used for heating railway cars, but are also adapted for house heating.

The Gold storage heater which has been for several years in use, consists of an outer casing and an inner vessel, the latter containing brine or other heat storing liquid, and the space between the inner vessel and outer casing constituting a steam passage. On steam being admitted to this passage, it acts both to radiate heat outwardly through the casing and thereby quickly heat up the apartment, and to conduct heat inwardly to charge the body of liquid with heat to be subsequently radiated after the supply of steam is cut off. These heaters have been found in practice highly efficient.

My present invention aims to provide a suitable storage heater wherein the use of liquid as the heat storage medium shall be avoided. To this end I substitute for the said inner vessel and liquid a solid body of unglazed earthenware, porous stone, or other equivalent substance having suitable capacity for thermic absorption and I construct this body to fit within a metallic casing into which steam is admitted, the storage body and the casing being in partial conductive contact in order to facilitate the radiation of heat from the body through the casing, and being partly out of contact in order to constitute steam spaces or passages for the admission of steam to heat the storage body, and to heat up the apartment by radiating heat outwardly through the casing.

Figure 12:
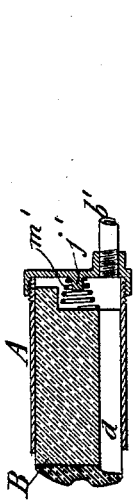
Figure 11:
Figure 1:
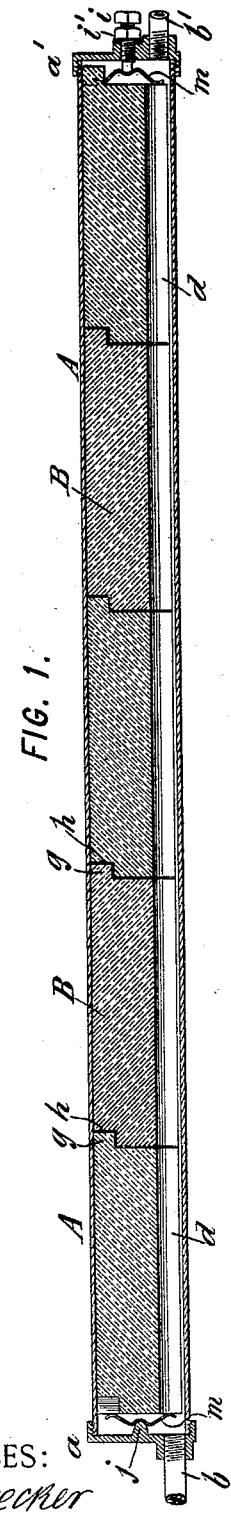
Figure 4:
Figure 3:
Figure 7:
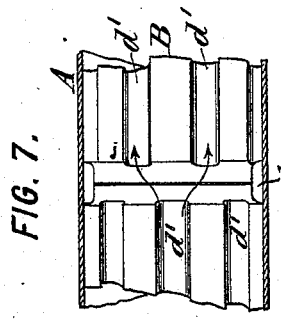
Figure 2:
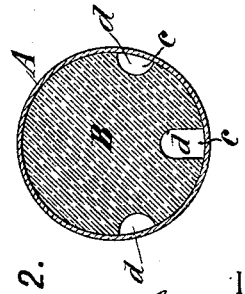

Figure 1 of the accompanying drawings is a vertical longitudinal section through my improved heat storage radiator. Fig. 2 is a transverse section thereof on a larger scale. Fig. 3 is an end elevation of one of the sections of the heat storing body. Fig. 4 is a plan of two sections thereof. Figs. 5, 6, 8, 9 and 10 are transverse sections illustrating modified constructions. Fig. 7 is a fragmentary longitudinal section of the construction shown in Fig. 6. Fig. 11 is a detail view of a spring removed. Fig. 12 is a fragmentary longitudinal section showing a modification.

Referring to the several figures of the drawings, let A designate the outer conducting casing, and B the inclosed heat storage body or heat absorbent. The casing A is constructed preferably as a tube of wrought iron, with heads $a\ a'$ screwed to its opposite ends, and with steam-pipes $b\ b'$ entering and leaving the opposite ends of the casing. The inclosed heat storage body B may be made of any suitable solid material having the capacity of absorbing and giving off heat. It may be made of soap-stone or of other kinds of stone, but I prefer to make it of some ceramic material, such as terra cotta, brick, or unglazed earthenware, such materials being preferable because of the greater ease and economy of manufacture. As the casing A is preferably of considerable length, it is best to subdivide the heat storage body B into sections of suitable length, as shown in Figs. 1 and 4.

The casing A and storage body B are so formed or constructed relatively to each other that they are partially in contact and partially out of contact, their contacting surfaces serving to facilitate the outward conduction of heat from the body B through the casing and its radiation therefrom, while the portions that are out of contact serve to form between them steam spaces or passages $c\ c$ for permitting the circulation of steam through the radiator. Preferably the outer casing is made of a cylindrical tube, and the body B is molded or shaped upon its exterior so as to deviate from a cylindrical form, being preferably formed with longitudinal grooves $d\ d$, as shown in Figs. 2 and 3. In these figures, three grooves are shown, one at the bottom and two at the sides.

Figure 6:
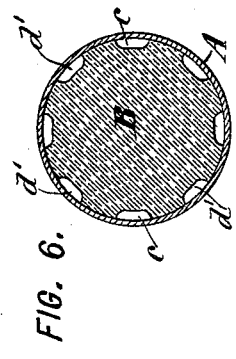

Fig. 6 shows a construction wherein the grooves, here lettered $d'$, are formed at intervals around the entire circumference of the body B.

Figure 5:
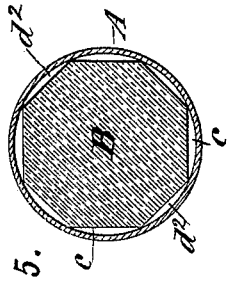

In the construction shown in Fig. 5, the body B is formed of polygonal cross-section having flattened faces $d^2$ $d^2$, the corners of the body alone coming in contact with the casing, and the spaces between the casing and flattened surfaces forming the steam passages $c$.

Figure 8:
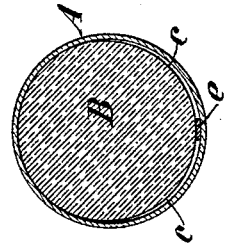

In Fig. 8 is shown a further modification wherein the casing A and body B are both made cylindrical, but the body is made slightly smaller than the casing and is forced against one side thereof by a wedge or block $e$ so as to assume an eccentric position and thereby form the steam spaces $c$.

Figure 9:
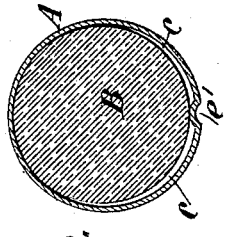

Instead of employing a separate wedge $e$, an inward corrugation or bead may be formed in the casing A extending longitudinally thereof and coming in contact with the inclosed heat storage body B, as shown in Fig. 9, where $e'$ indicates the corrugation or bead.

Figure 10:
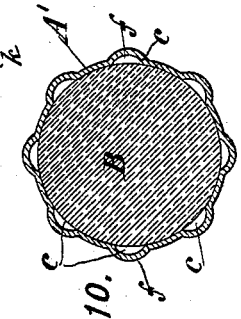

Fig. 10 shows a construction in which the body B is made cylindrical and a tight fit with the casing A', the latter being formed with outward corrugations $f$ $f$ at intervals, so that the spaces within these corrugations and between them and the surfaces of the body B, constitute the steam spaces $c$ $c$.

The steam passages should be continuous from end to end of the casing A, in order that the steam admitted at one end may pass uninterruptedly through to the opposite end of the casing, and in order that water of condensation which may form within the radiator may be drained off.

When the body is subdivided into separate sections, and the steam passages are formed by longitudinal grooves or equivalent formations upon the exterior of the body, it is important that these sections shall be so constructed that in fitting them together the longitudinal grooves on the respective sections shall communicate with one another. Their communication may be effected by forming a circumferential groove at the adjoining ends of the two sections in the manner shown in Fig. 7, the circumferential groove $k$ being formed as a half-round groove, a quarter-round rabbet being formed at each of the abutting ends of the sections. The communication between the grooves $d'$ $d'$ of the successive sections is completed through this groove $k$ whenever the grooves $d'$ do not happen to be in alignment. Another and preferable construction is to provide means for insuring the alignment of the grooves, the preferred means being that shown in Figs. 1, 3 and 4. The sections are here provided with interfitting projections and recesses adapted to prevent their relative rotative displacement, and insuring that they shall be fitted together in only one angular position. Each section is formed with a projection or tongue $g$ at one end, and with a recess or groove $h$ at the opposite end, the tongue of each section being adapted to enter the groove in any other section, so that in fitting the sections together, the tongues and grooves are interlocked as they are slid into the casing. In the preferred construction, the projections and recesses $g$ $h$ are arranged at the top, and one of the grooves $d$ at the bottom of the casing, as shown in Figs. 1, 2 and 3. The central groove in Fig. 2 constitutes a channel or passage into which water of condensation will drain, and through which it may flow out.

In order to prevent any possibility of the sections rattling in the casing, I provide a tightening screw $i$ screwing through one of the heads $a'$, while the other head may be similarly constructed or may have simply a lug $j$ cast in it to bear against the end section and hold it out of contact with the head to form a steam passage between for enabling steam to enter the side grooves $d$ $d$. After sliding in all the sections and screwing on the head $a$, the screw $i$ is screwed in tight against the sections thereby forcing them into firm contact with one another and preventing rattling. To make the joint steam-tight where the screw $i$ passes through the head $a'$, I screw on a set-nut $i'$ with a packing washer beneath it.

To provide for the expansion and contraction of the metal casing A, as it is heated and cooled, which expansion and contraction will be considerably in excess of that of the heat storing body B, I prefer to interpose springs between the opposite ends or end sections of the body and the ends of the casing.

In the construction shown in Fig. 1, a spring or spring-washer $m$, shown separately in Fig. 11, is interposed between the end section of the body B and the lug $j$ of the casing, and a similar spring or spring-washer is interposed at the opposite end between the end section and the screw $i$. The screwing in of the screw compresses these two springs and holds the several sections firmly together between them, while the elasticity of the springs is sufficient to allow for the expansion and contraction of the shell.

Another construction of springs is that shown in Fig. 12, where a spiral spring $m'$ is inserted at each end bearing against the end section of the body B, and held in place by a central projection $j'$ from the cap or screw-head of the casing. As the head is screwed on, this spring is compressed and thereby serves to steady the sections of the body B and prevent rattling, while at the same time allowing for the expansion and contraction of the shell.

My improved heat storage radiator is of very simple and cheap construction, and has the advantage over those wherein liquid is employed as the heat storing medium, that there is no possibility of leakage of the liquid into the steam space in the casing.

My improved radiator differs from prior storage heaters having a solid heat storage body absorbent, in that the heat-absorbent body or core of the heater is supported directly by the casing, which is itself a cylinder or pipe, thus dispensing with all means, apart from these two elements, for sustaining them relatively to each other along their sides. My improved construction is simpler, and is conducive to cheapness and facility in making and assembling the elements of the radiator, and so directs the heating agent that it first heats exteriorily and while radiating heat outwardly stores heat in the interior core, which being mainly in contact with the casing, can efficiently transmit its stored heat to the casing on the withdrawal of the steam heat.

I claim as my invention the following defined novel features substantially as hereinbefore specified, namely:

1. A radiator consisting of an outer conducting casing, and a steam-pipe opening thereinto combined with an inclosed solid heat-storage body of unglazed earthenware or analogous material filling said casing, the casing and storage body being relatively shaped to form steam passages between them, substantially as set forth.

2. A radiator consisting of an outer conducting casing, and a steam-pipe opening thereinto combined with an inclosed solid heat-storage body of unglazed earthenware or analogous material filling said casing and formed with longitudinal grooves to form steam passages between it and the casing.

3. A radiator consisting of an outer longitudinally-extended conducting casing, and a steam-pipe opening thereinto combined with an inclosed solid heat-storage body of unglazed earthenware or analogous material partly in contact with the inner walls of the casing and partly out of contact therewith to form longitudinal steam-passages between, and divided transversely into sections fitting together end to end.

4. A radiator consisting of an outer conducting casing, combined with an inclosed solid heat-storage body partly in contact with the inner walls of the casing and partly out of contact therewith to form longitudinal steam-passages between, divided into sections, and the sections formed with interfitting projections and recesses, adapted to prevent the rotative displacement of the sections.

5. A radiator consisting of an outer conducting casing, and a steam-pipe opening thereinto combined with an inclosed solid heat-storage body in partial conductive contact with the inner walls of the casing, and the two relatively constructed to be partly out of contact to form steam spaces between them, and a tightening screw screwing into the casing for clamping the heat storage body fast in the casing to prevent rattling.

6. A radiator consisting of an outer conducting casing, combined with an inclosed solid heat-storage body in partial conductive contact with the inner walls of the casing, and the two relatively constructed to be partly out of contact to form steam spaces between them, and a spring compressed between the end of the heat storage body and the end of the casing, and adapted to hold the body firmly in place to prevent rattling, while allowing for the expansion and contraction of the casing.

In witness whereof I have hereunto signed my name in the presence of two subscribing witnesses.

EDWARD E. GOLD.

Witnesses:
ARTHUR C. FRASER,
CHARLES K. FRASER.